(12) United States Patent
Yatake

(10) Patent No.: US 6,454,846 B2
(45) Date of Patent: Sep. 24, 2002

(54) INK COMPOSITION SUITABLE FOR USE IN INK JET RECORDING

(75) Inventor: Masahiro Yatake, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 39 days.

(21) Appl. No.: 09/790,253

(22) Filed: Feb. 21, 2001

(30) Foreign Application Priority Data

Feb. 23, 2000 (JP) ........................................ 2000-046399
Apr. 21, 2000 (JP) ........................................ 2000-121464

(51) Int. Cl.$^7$ ............................................... C09D 11/02
(52) U.S. Cl. ................................ 106/31.58; 106/31.59; 106/31.86; 106/31.89
(58) Field of Search ........................ 106/31.58, 31.59, 106/31.86, 31.89

(56) References Cited

U.S. PATENT DOCUMENTS

| | | | |
|---|---|---|---|
| 5,156,675 A | 10/1992 | Breton | |
| 5,183,502 A | 2/1993 | Meichsner | |
| 5,196,056 A | 3/1993 | Prasad | |
| 5,849,067 A | 12/1998 | Tsuchiya | |
| 5,879,439 A | * 3/1999 | Nagai et al. ............. | 106/31.28 |
| 5,952,414 A | 9/1999 | Noguchi | |
| 5,985,014 A | 11/1999 | Veda et al. ............. | 106/31.58 |
| 5,993,524 A | * 11/1999 | Nagai et al. ............. | 106/31.27 |
| 6,051,057 A | * 4/2000 | Yatake et al. ............ | 106/31.58 |
| 6,379,443 B1 | * 4/2002 | Komatsu et al. ......... | 106/31.58 |

FOREIGN PATENT DOCUMENTS

| | | | |
|---|---|---|---|
| EP | 0878522 | 11/1998 | |
| JP | 56(1981)-147861 | 11/1981 | ........... C09D/11/00 |
| JP | 03(1991)-152170 | 6/1991 | ........... C09D/11/00 |
| JP | 04(1992)-18465 | 1/1992 | ........... C09D/11/00 |
| JP | 09(1997)-111165 | 4/1997 | ........... C09D/11/00 |
| JP | 09(1997)-328644 | 12/1997 | ........... C09D/11/00 |

OTHER PUBLICATIONS

JPO Abstract 56(1981)–147861, Nov. 17, 1981.
JPO Abstract 03(1991)–152170, Jun. 28, 1991.
JPO Abstract 04(1992)–18465, Jan. 22, 1992.

* cited by examiner

Primary Examiner—Helene Klemanski
Assistant Examiner—Veronica F. Faison
(74) Attorney, Agent, or Firm—Ladas & Parry

(57) ABSTRACT

An ink composition is provided which can yield prints having high color density and, even when printed on recycled papers, causes no significant feathering or bleeding and, at the same time, has excellent ejection stability and storage stability, The ink composition comprises a colorant, water, and a compound represented by formula (I):

$$R\text{-}(EO)_n\text{-}(PO)_m\text{-}M$$

wherein R represents an alkoxy group having in its molecular chain an acetylene bond; EO represents an ethyleneoxy group; and PO represents a propyleneoxy group; n and m each represent a repeating unit in terms of an average value in the whole system. EO and PO may be present in any order in the molecule. M represents a terminal group attached to the terminal oxygen atom of EO or PO.

24 Claims, No Drawings

INK COMPOSITION SUITABLE FOR USE IN INK JET RECORDING

BACKGROUND OF THE INVENTION

1. Field of the Invention

The present invention relates to an ink composition suitable for use in ink jet recording.

2. Background Art

Ink jet recording is a printing method wherein droplets of an ink composition are ejected and deposited on recording media, such as paper, to print, for example, letters or figures. The method have the advantage of realizing images, having high quality with high resolution at a high speed by means of a relatively inexpensive apparatus.

Examples of ink jet recording methods which have been developed and put to practical use include: a method wherein an electric signal is converted to a mechanical signal using an electrostrictive element to intermittently eject an ink reservoired in a nozzle head section, thereby recording letters or symbols on the surface of a recording medium; and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Various properties required of ink compositions for an ink jet recording method are such that the drying property of the print is good, no significant feathering is created in printed images, uniform printing can be realized on the surface of conventional recording media, and, in the case of multicolor printing, mixing between adjacent colors does not occur. In particular, it is important for the ink compositions for ink jet printing to realize good images having no feathering or bleeding attributable to paper fibers of paper as a recording medium.

In conventional inks, particularly pigment-based inks, a technique has been proposed wherein the penetration of ink is mainly suppressed to suppress wetting of the surface of paper by the ink and consequently to allow ink droplets to stay near the surface of paper, whereby print quality is ensured.

On the other hand, an attempt has also been made to increase the penetration of the ink composition into paper to suppress feathering or bleeding. For example, the use of an additive for lowering the surface tension of the ink composition to increase the penetration speed of the ink composition into paper and thus to reduce feathering or bleeding has been proposed. More specifically, the use of diethylene glycol monobutyl ether (U.S. Pat. No. 5,156,675) or Surfynol 465 (manufactured by Air Products and Chemicals Inc., U.S.A.) (U.S. Pat. No. 5,183,502) as an acetylene glycol surfactant or the combined use of diethylene glycol monobutyl ether and Surfynol 465 (U.S. Pat. No. 5,196,056) has been proposed. Further, an ink composition has been proposed which contains, as a wetting agent, polyglycerin (Japanese Patent Laid-Open No. 152170/1991), polyglycerin with an ethyleneoxy group added thereto (Japanese Patent Laid-Open No. 328644/1997), or glycerin with an ethyleneoxy group added thereto (Japanese Patent Laid-Open No. 18465/1992).

Further, the addition of a glycol ether compound to an ink composition has been proposed from the viewpoint of improving the penetration of the ink composition into paper. For example, Japanese Patent Laid-Open No. 147861/1981 describes the addition of triethylene glycol monomethyl ether to a pigment-containing ink composition, and Japanese Patent Laid-Open No. 111165/1997 describes an example of a combination of a water-soluble dye with ethers of ethylene glycol, diethylene glycol, or triethylene glycol.

For the above-described conventional ink compositions, however, there is still room for improvement, for example, in the effect of preventing feathering or bleeding, storage stability, and fixation of prints.

SUMMARY OF THE INVENTION

The present inventors have now found that the addition of a compound having a combination of an acetylene structure with ethyleneoxy or propyleneoxy groups can realize ink compositions having various excellent properties, excellent drying properties and excellent storage stability and thus that the ink composition can yield images having no significant feathering or bleeding on various recording media, particularly on plain papers and recycled papers. The present inventors have further found that these ink compositions have various excellent properties, for example, ejection stability, required of ink compositions for ink jet recording. The present invention has been made based on such finding.

Accordingly, it is an object of the present invention to provide an ink composition which has various excellent properties, especially an ink composition which can yield prints having excellent drying properties and has excellent storage stability, and can realize images having no significant feathering or bleeding on various recording media, particularly on plain papers and recycled papers.

It is another object of the prevent invention to provide an ink composition having various excellent properties, for example, ejection stability, required of ink compositions for ink jet recording.

According to one aspect of the present invention, there is provided an ink composition comprising at least a colorant, water, and a compound represented by formula (I).

RO[-(EO)$_n$-(PO)$_m$]M  (I)

wherein

R represents a group represented by formula;

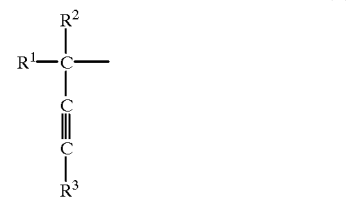

(II)

$R^1$ represents an alkyl, cycloalkyl, or aryl group;

EO represents an ethyleneoxy group;

PO represents a propyleneoxy group;

m and n each are independently 0 (zero) or a natural number of not less than 1, provided that m+n>1;

EO and PO may be arranged, regardless of order in the parentheses of formula (I), randomly or as blocks joined together;

$R^2$ and $R^3$ each independently represent a hydrogen atom or an alkyl group; and M is a group attached to the terminal oxygen atom within the parentheses.

DETAILED DESCRIPTION OF THE INVENTION

Ink composition

The ink composition according to the present invention may be used in recording methods using an ink composition. Recording methods using an ink composition include, for example, an ink jet recording method, a recording method using writing utensils, such as pens, and other various recording methods. In particular, the ink composition according to the present invention is preferably used in an ink jet recording method.

Compound represented by formula (I)

In formula (I), R represents a group represented by formula (II), and the total number of carbon atoms of R is preferably 4 to 50, more preferably 4 to 30, from the viewpoint of the penetration of the ink composition and the solubility of the compound represented by formula (I) in water. When the total number of carbon atoms of R exceeds 30, the hydrophobicity of the compound is enhanced. Therefore, in some cases, the number of ethyleneoxy groups or propyleneoxy groups may be increased to ensure the water solubility of the compound. Further, according to finding of the present inventors, a compound, wherein the total number of carbon atoms of R exceeds 30, is likely to cause foaming. Therefore, when such a compound is used, care may be taken so as to avoid the occurrence of the unfavorable foaming phenomenon.

In formula (II), $R^1$ represents an alkyl group (preferably $C_{3-20}$ alkyl, more preferably $C_{5-10}$ alkyl), a cycloalkyl group (preferably $C_{3-20}$ cycloalkyl, more preferably $C_{5-10}$ cycloalkyl), an aryl group (preferably phenyl, naphtyl, biphenyl, tolyl, xylyl, or cumyl).

In formula (I), EO represents an ethyleneoxy group, PO represents a propyleneoxy group, and n and m each independently are a number of 0 (zero) or 1 or more.

In the present invention, the compound represented by formula (I) is a single compound selected from the group consisting of compounds represented by formula (I), or alternatively is a mixture of at least two compounds selected from the group consisting of compounds represented by formula (I). When the single compound is used as the compound represented by formula (I), this single compound may be obtained by separation from a mixture of two or more compounds represented by formula (I) by distillation or other conventional process.

According to a preferred embodiment of the present invention, when m in formula (I) is 0 (zero), n is preferably 1 to 10. On the other hand, when m is not 0, n is preferably 0 to 10 with m being 1 to 5.

EO and PO may be arranged, regardless of order in the parentheses of formula (I), randomly or as blocks joined together. In the compound represented by formula (I), when n and m are not simultaneously 0, a compound having a structure, wherein PO has been added to an organic group represented by formula (II) followed by the addition of EO, is preferred from the viewpoint of print quality.

$R^2$ and $R^3$ each independently represent a hydrogen atom or an alkyl group, preferably an alkyl group having 1 to 6 carbon atoms.

M represents a group attached to the terminal oxygen atom within the parentheses. According to a preferred embodiment of the present invention, M in formula (I) is preferably selected from (i) a hydrogen atom,
(ii) an alkali metal, an inorganic base, or an organic base, or
(iii) a residue of an acid selected from the group consisting of sulfonic acid, phosphoric acid, and boric acid, or a salt of said acid with said compound (ii).

Preferred examples of M include (a) a hydrogen atom, (b) lithium, sodium, and potassium as alkali metals, (c) ammonia as the inorganic base, and (d) organic amines as the organic base. Specific examples of organic amines include mono-, di-, or tri-(hydroxy-$C_{1-6}$ alkyl)amine, for example, monoethanolamine, diethanolamine, triethanolamine, monoisopropanolamine, and mono-s-butanolamine.

When M or the counter ion contained in M is one which is liberated in the ink, all the ion species of the compound represented by formula (I) contained in the ink composition are preferably identical.

The compound represented by formula (I) is preferably synthesized by the following method:

(a) a method wherein a target molar amount of ethylene oxide or propylene oxide is added in the presence of an alkali or the like to an alcohol represented by formula R—OH, wherein R is as defined above, is used as a starting compound, to form the compound represented by formula (I), or (b) a method wherein a mono- or poly-ethylene glycol or a mono- or poly-propylene glycol is subjected to dehydro-addition.

The compound represented by formula (I), which has been produced by the above method, is generally in the form of a mixture of a plurality of compounds wherein n and m are different from each other. As described above, this mixture as such can be added to the ink composition, or alternatively can be optionally isolated into a single kind of compound.

Commercially available products may be utilized as the alcohol represented by formula R—OH. Specific examples thereof include; Surfynol 61 which is an alcohol represented by R—OH wherein $R^1$ represents an isobutyl group, $R^2$ represents a methyl group, and $R^3$ represents a hydrogen atom; Olfine B which is an alcohol represented by R—OH wherein $R^1$ and $R^2$ each represent a methyl group and $R^3$ represents a hydrogen atom; and Olfine P which is an alcohol represented by R—OH wherein $R^1$ represents an ethyl group, $R^2$ represents a methyl group, and $R^3$ represents a hydrogen atom (all the above products being available from Nissin Chemical Industry Co., Ltd).

Preferably, the alcohol used in the production of the compound represented by formula (I) does not remain in the product. The amount of the residual alcohol, if any, is preferably not more than 1% by weight. This is because, when the amount of the residual alcohol is not more than 1% by weight, it is possible to effectively avoid problems including high susceptibility to wetting of the head in its nozzle face to cause the formation of prints having deteriorated quality, and the emission of the odor of alcohol In the present invention, the average molecular weight of the compound represented by formula (I) is preferably not more than 2000, more preferably not more than 1000, still more preferably not more than 500.

Preferably, the ink composition according to the present invention further comprises a penetrating agent selected from the group consisting of propylene glycol monobutyl ether, dipropylene glycol monobutyl ether, and mixtures thereof. Although the ink composition for ink jet recording according to the present invention has excellent penetrability, these penetrating agents can further improve the penetration effect. The amount of the penetrating agent added is preferably not more than 10% by weight, more preferably 0.5 to 5% by weight. The weight ratio of the compound represented by formula (I) to the penetrating agent is preferably 1:0 to 1:10.

According to a preferred embodiment of the present invention, the ink composition according to the present invention further comprises an acetylene glycol surfactant. The addition of the acetylene glycol surfactant can further improve the print quality. The amount of the acetylene glycol surfactant added is preferably not more than 5% by weight, more preferably 0.1 to 2% by weight, from the viewpoints of the effect improved by the addition of the acetylene glycol surfactant and the prevention of an increase in viscosity.

According to a preferred embodiment of the present invention, the weight ratio of the compound represented by formula (I) to the acetylene glycol surfactant is 1:0 to 1:3.

Examples of preferred acetylene glycol surfactants include compounds represented by formula

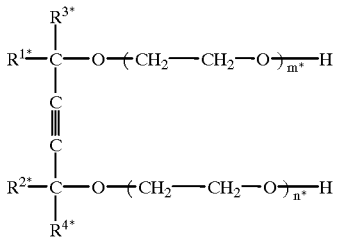

wherein $0 \leq m^* + n^* \leq 50$; and $R^{1*}$, $R^{2*}$, $R^{3*}$, and $R^{4*}$ each independently represent an alkyl group, preferably a $C_{1-6}$ alkyl group.

Commercially available products may be used as the compound represented by the above formula, and examples thereof include Olfine Y and Surfynol 82. Surfynol 440, Surfynol 465, and Surfynol 485 (all the above products being manufactured by Air Products and Chemicals Inc.). They may be used alone or in combination of two or more.

According to a preferred embodiment of the present invention, when the acetylene glycol surfactant is used, diethylene glycol monobutyl ether or triethylene glycol monobutyl ether is added in combination with the acetylene glycol surfactant from the viewpoint of improving the solubility. The amount of the acetylene glycol surfactant added is preferably not more than 20% by weight from the viewpoint of properly maintaining the viscosity of the ink composition. The weight ratio of the compound represented by formula (I) to diethylene glycol monobutyl ether or triethylene glycol monobutyl ether is preferably 1:0 to 1:10.

According to the present invention, the colorant may be properly selected from dyes or pigments. If necessary, the dye and the pigment may be properly used in combination.

According to the present invention, various dyes commonly used in ink jet recording, such as direct dyes, acid dyes, foodstuff dyes, basic dyes, reactive dyes, disperse dyes, vat dyes, and soluble vat dyes, may be used as the dye. Further, colorants, which fall into categories of oil soluble dyes and basic dyes, may also be used.

Various pigments, for example, inorganic or organic pigments, may be used as the pigment. Specific examples thereof include:

(a) pigments for black, for example, carbon blacks (C.I. Pigment Black 7), such as furnace black, lamp black, acetylene black, and channel black, metal oxides, such as copper oxide, iron oxide (C.I. Pigment Black 11), and titanium oxide, and organic pigments, such as aniline black (C.I. Pigment Black 1);

(b) pigments for yellow, for example, C.I. Pigment Yellow 1 (Fast Yellow G), 3, 12 (Disazo Yellow AAA), 13, 14, 17, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, and 153;

(c) pigments for magenta, for example, C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48;4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (iron oxide red), 104, 105, 106, 108 (cadmium red), 112, 114, 122 (quinacridone magenta), 123, 146, 149, 166, 168, 170, 172, 177, 178, 179, 185, 190, 193, 202, 209, and 219; and (d) pigments for cyan, for example, C.I. Pigment Blue 1, 2, 15 (Phthalocyanine Blue R), 15:1, 15:2, 15:3 (Phthalocyanine Blue G). 15:4, 15:6 (Phthalocyanine Blue E), 16, 17:1, 56, 60, and 63, and C.I. Pigment Green 1, 4, 7, 8, 10, 17, 18, and 36, Further, predispersed pigments, such as grafted carbons, produced by treating the surface of pigments, for example, with resin may also be used.

According to the present invention, the particle diameter of the pigment is preferably not more than 25 $\mu$m, more preferably not more than 1 $\mu$m, still more preferably not more than 0.1 $\mu$m.

According to a preferred embodiment of the present invention, the pigment is preferably one which can be dispersed in the ink composition with the aid of a dispersant or a surfactant, or a surface treated pigment which has on its surface a dispersion group and can be dispersible in an aqueous medium without the aid of any dispersant.

In the ink composition according to the present invention, the dispersant, which may be used in dispersing the pigment in the ink, is preferably a resin dispersant wherein the molecular skeleton is constituted by a styrene/acrylic acid copolymer resin, the weight average molecular weight (hereinafter referred to simply as "molecular weight") is 1,600 to 25,000 and the acid value is 100 to 250. Specific examples of such dispersants include those manufactured by Johnson Polymer Corp., for example, Joncryl 68 (molecular weight 10,000, acid value 195), Joncryl 680 (molecular weight 3,900, acid value 215), Joncryl 682 (molecular weight 1,600, acid value 235), Joncryl 550 (molecular weight 7,500, acid value 200). Joncryl 555 (molecular weight 5,000, acid value 200), Joncryl 586 (molecular weight 3,100, acid value 105), Joncryl 683 (molecular weight 7,300, acid value 150), and B-36 (molecular weight 6,800, acid value 250).

In order to dissolve the resin dispersant, the residue of acrylic acid in the resin dispersant is preferably in the form of a salt. Neutralizers usable for the formation of the salt include, for example, aminomethylpropanol, 2-aminoisopropanol, triethanolamine. morpholine, and ammonia. The addition of the neutralizer in an amount of at least the neutralization equivalent of the dispersant suffices for contemplated results. The amount of the neutralizer added, however, is preferably about 1.3 times the neutralization equivalent from the viewpoint of the fixation after printing.

Further, pH buffer is preferably added to facilitate ion dissociation of the salt in the dispersant, thereby regulating the ink to an optimal pH value. Specific examples of pH buffers usable herein include potassium hydrogenphthalate, potassium dihydrogenphosphate, disodium hydrogenphosphate, sodium tetraborate, potassium hydrogentartrate, sodium hydrogencarbonate, sodium carbonate, tris(hydroxymethyl)aminomethane, and tris (hydroxymethyl)aminomethane hydrochloride. From the viewpoint of the durability of the head member and the stability of the ink, the amount of the pH buffer added is preferably such that the pH value of the ink composition is brought to about 7 to 10.

In the present invention, the dispersion group in "the surface treated pigment which has on its surface a dispersion group and can be dispersible in an aqueous medium without the aid of any dispersant" refers to a group which can render the pigment dispersible by itself, that is, without the addition of any dispersant in an aqueous medium. Specific examples of dispersion groups include carboxyl, carbonyl, hydroxyl, and sulfonic acid groups.

The introduction of the dispersion group into the surface of the pigment may be properly carried out according to the type of the dispersion group. For example, carboxyl or hydroxyl groups can be introduced by oxidation. The oxidation refers to a method wherein the pigment is oxidized in a liquid phase or gaseous phase with an oxidizing agent, for example, ozone, nitric acid, hydrogen peroxide, hypohalous acid, nitrogen oxide, or fluorine gas. Plasma treatment of the surface of the pigment also can introduce carboxyl or hydroxyl groups into the surface of the pigment. On the other hand, when sulfonic acid groups are introduced as the dispersion group, the sulfonic acid groups can be introduced by sulfonation. The sulfonation refers to treatment with a sulfonating agent, such as sulfuric acid, fuming nitric acid, sulfonated pyridine-carboxylic acid, sulfamic acid, sulfur trioxide, chlorosulfuric acid, or amidosulfuric acid. These oxidizing agents and sulfonating agents may be used alone or as a mixture of two or more.

The surface treated pigment is also stable against glycol ethers, for example, (di)propylene glycol monobutyl ether and di(tri)ethylene glycol monobutyl ether which are used as a surface tension modifier. This is advantageous over the dispersion of the pigment with the aid of a dispersant in that the pigment can be stably stored and used under high temperature or low temperature conditions.

According to the present invention, the content of the colorant is preferably 0.5 to 30% by weight, more preferably 1 to 12% by weight, based on the ink composition from the viewpoint of ensuring the print density and preventing a deterioration in ejection stability due to an increase in viscosity.

If necessary, the ink composition according to the present invention may further contain optional ingredients, such as water-soluble organic solvents, preservatives, fungicides, antioxidants, electric conductivity adjustors, pH adjustors, viscosity modifiers, other surface tension modifiers, and oxygen absorbers, These optional ingredients may be used solely or as a mixture of a plurality of optional ingredients falling within the same category or a plurality of optional ingredients selected from different categories.

For example, water-soluble glycols or saccharides may be used to prevent the ink composition from being dried at the front face of nozzles in the recording head.

Examples of water-soluble glycols usable herein include ethylene glycol, diethylene glycol, triethylene glycol, propylene glycol, dipropylene glycol, tripropylene glycol, polyethylene glycol having a butanediol, 1,3-butanediol, 1,2-pentanediol, 5-pentanediol, 1,2-hexanediol, 1,6-hexanediol, 1,2,6-hexanetriol, 1,8-octanediol, 1,2-octanediol, glycerin, mesoerythritol, and pentaerythritol.

Saccharides usable herein include monosaccharides and polysaccharides. More specific examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount of the saccharide added to the ink composition is preferably 0.05 to 30% by weight from the viewpoints of restoring the front end of the head, clogged with the ink as result of drying of the ink, to its original condition, that is, to unclogged state, and preventing an increase in viscosity of the ink. The amount of the monosaccharide and the polysaccharide, such as glucose, mannose, fructose, ribose, xylose, arabinose, lactose, galactose, aldonic acid, glucitose, maltose, cellobiose, sucrose, trehalose, or maltotriose, is more preferably 3 to 20% by weight. The amount of alginic acid and salts thereof, cyclodextrins, and celluloses added is preferably such that the addition of these compounds does not excessively increase the viscosity of the ink.

The ink composition according to the present invention may further contain the following compounds: alkyl alcohols having 1 to 4 carbon atoms; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; formamide; acetamide; dimethyl sulfoxide sorbit; sorbitan; acetin; diacetin; triacetin; and sulfolane. These compounds are compatible with water, and can improve the solubility of glycol ethers, which have low solubility in water, contained in the ink composition and the ink ingredients, and, in addition, can improve the penetration of the ink composition into recording media, for example, paper, or can prevent nozzle clogging.

The ink composition according to the present invention may further comprise other surfactant from the viewpoint of regulating the penetration of the ink composition into recording media, or regulating the surface tension of the ink composition. The surfactant is preferably highly compatible with the ink composition according to the present invention. Further, the surfactant preferably has high penetration and is highly stable. Such surfactants include, for example, amphoteric surfactants and nonionic surfactants.

Specific examples of amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives.

Specific examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acid.

For example, sodium benzoate, pentachloroprenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI) may be used as preservatives or fungicides in the ink composition of the present invention.

pH adjustors, solubilizers, or antioxidants usable herein include: amines, for example, alkanolamines, such as diethanolamine, triethanolamine, and propanolane, alkylalkanolamines, such as methyldiethanolamine, dimethylethanolamine, ethyldiethanolamine, and diethylethanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-polyvinyl alcohol, hydroxypropylcellulose, carboxymethylcellulose, hydroxyethylcellulose, methylcellulose, salts of polyacrylic acid, polyvinylpyrrolidone, gum arabic, and starch.

When the ink composition according to the present invention is used in ink jet recording, various additives are preferably added to the ink, for example, from the viewpoints of ensuring stability under standing conditions, and realizing stable ejection from an ink ejection head.

Further, commercially available antioxidants and ultraviolet absorbers may also be used, and examples thereof include: Tinuvin 328, 900, 1130, 384, 292, 123, 144, 622, 770, and 292, Irgacor 252 and 153, and Irganox 1010, 1076, 1035, and MD 1024, manufactured by Ciba-Geigy; and lanthanide oxides.

EXAMPLES

The present invention will be described in more detail with reference to the following examples, though it is not limited to these examples only.

Pigment dispersion 1

A styrene/acrylic acid copolymer resin (weight average molecular weight 25,000, acid value 200) (4 parts by weight), 2.7 parts by weight of triethanolamine, and 0.4 part by weight of isopropyl alcohol, were fully dissolved in 72.9 parts by weight of ion-exchanged water with heating at 70° C. Carbon Black MA-100 (manufactured by Mitsubishi Chemical Corporation) (20 parts by weight) was then added to the solution. After premixing, dispersion was carried out by means of Eiger Mill (manufactured by Eiger Japan) to an average particle diameter of the pigment of 100 nm (percentage beads packing=70%, media diameter=0.7 nm) to prepare a contemplated pigment dispersion. The pigment dispersion was diluted, and the diluted pigment dispersion was measured for the average diameter of dispersed particles by a laser scattering method and found to be 105 nm.

Pigment dispersion 2

A pigment dispersion 2 was prepared in the same manner as in the pigment dispersion 1, except that copper phthalocyanine was used instead of carbon black. The pigment dispersion 2 thus obtained had an average diameter of dispersed particles of 85 nm.

Pigment dispersion 3

The surface of carbon black was oxidized with nitric acid to introduce mainly a modification group terminated with carbonyl and carboxyl groups into the surface of the carbon black to prepare a self-dispersible carbon black as a pigment dispersion 3. The pigment dispersion 3 thus obtained had an average diameter of dispersed particles of 90 nm.

Pigment dispersion 4

The surface of carbon black was oxidized with sulfuric acid to introduce mainly a modification group terminated with sulfone groups into the surface of the carbon black to prepare a self-dispersible carbon black as a pigment dispersion 4. The pigment dispersion 4 thus obtained had an average diameter of dispersed particles of 85 nm.

The following abbreviations are used in the following description.

DEGmBE: diethylene glycol monobutyl ether,

TEGmBE: triethylene glycol monobutyl ether,

PGmBE: propylene glycol monobutyl ether,

DPGmBE: dipropylene glycol monobutyl ether, and

DEGmME: diethylene glycol monomethyl ether.

In the following examples, 0.1 to 1% by weight of Proxel XL-2, 0.001 to 0.05% by weight of benzotriazole, and 0.01 to 0.03% by weight of EDTA were added to water as the balance.

| Example A1 | |
|---|---|
| | (wt %) |
| Pigment dispersion 1 | 5.0 (solid basis) |
| Compound A1 | 3.0 |
| DEGmBE | 2.0 |
| Glycerin | 6.0 |
| 1,5-Pentanediol | 5.0 |
| Triethanolamine | 0.8 |
| Ion-exchanged water | Balance |

The compound A1 is a compound represented by formula (I) wherein R has the structure of Surfynol 61, n is 2.0, m is 0 (zero), and M represents sodium.

| Example A2 | |
|---|---|
| | (wt %) |
| Pigment dispersion 2 | 4.5 (solid basis) |
| Compound A2 | 5.0 |
| PGmBE | 2.0 |
| Dipropylene glycol | 5.0 |
| Surfynol 465 | 1.2 |
| Triethanolamine | 0.9 |
| Ion-exchanged water | Balance |

The compound A2 is a compound represented by formula (I) wherein R has the structure of Olfine B, n is 3.0, m is 0 (zero), and M represents $-N(C_2H_4OH)_3$.

Example A3

| | (wt %) |
|---|---|
| Pigment dispersion 3 | 5.5 (solid basis) |
| Compound A3 | 2.0 |
| DPGmBE | 1.5 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance | is 4.0, m is 0 (zero), and M represents a hydrogen atom.

Example A4

| | (wt %) |
|---|---|
| Pigment dispersion 4 | 5.0 (solid basis) |
| C.I. Direct Black 154 | 1.0 |
| Compound A4 | 1.0 |
| TEGmBE | 3.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

The compound A4 is a compound represented by formula (I) wherein R has the structure of Surfynol 61, n is 3.0, m is 0 (zero). and M represents —NH$_4$.

Example A5

| | (wt %) |
|---|---|
| Pigment dispersion 1 | 3.0 (solid basis) |
| C.I. Direct Black 154 | 1.0 |
| Compound A5 as mixture | 7.0 |
| DEGmBE | 2.0 |
| Glycerin | 14.0 |
| Triethanolamine | 0.9 |
| Ion-exchanged water | Balance |

The compound A5 is a mixture composed of; 50% by weight of a compound represented by formula (I) wherein R has the structure of Surfynol 61, n is 4.0, m is 0 (zero), and M represents potassium; and 50% by weight of a compound represented by formula (I) wherein R has the structure of Olfine P, n is 2.0, m is 0 (zero), and M represents potassium.

Example A6

| | (wt %) |
|---|---|
| C.I. Direct Yellow 132 | 5.0 |
| Compound A6 | 4.0 |
| TEGmBE | 4.0 |
| Thiodiglycol | 2.0 |

-continued

Example A6

| | (wt %) |
|---|---|
| 1,5-Pentanediol | 1.0 |
| Triethanolamine | 0.9 |
| Ion-exchanged water | Balance |

The compound A6 is a compound represented by formula (I) wherein R has the structure of Surfynol 61, provided that R$^3$ represents C$_2$H$_5$—, n is 7.0, m is 0 (zero), and M represents lithium.

Example A7

| | (wt %) |
|---|---|
| C.I. Direct Blue 86 | 5.0 |
| Compound A7 as mixture | 10.0 |
| DEGmBE | 3.0 |
| Glycerin | 5.0 |
| Trimethylolpropane | 1.0 |
| Trimethylolethane | 1.0 |
| Surfynol 465 | 1.0 |
| Triethanolamine | 0.5 |
| Potassium hydroxide | 0.05 |
| Ion-exchanged water | Balance |

The compound A7 is a mixture composed of: 50% by weight of a compound represented by formula (I) wherein R has the structure of Surfynol 61, n is 1, m is 0 (zero), and M represents —BO$_3$Na; and 50% by weight of a compound represented by formula (I) wherein R has the structure of Olfine B, n is 1, m is 0 (zero), and M represents —SO$_3$K.

Example A8

| | (wt %) |
|---|---|
| C.I. Acid Red 52 | 5.5 |
| Compound A8 as mixture | 1.5 |
| Glycerin | 5.0 |
| Diethylene glycol | 5.0 |
| Tetrapropylene glycol | 5.0 |
| Triethanolamine | 0.9 |
| Potassium hydroxide | 0.1 |

The compound A8 is a mixture composed of: 50% by weight of a compound represented by formula (I) wherein R has the structure of Olfine B, n is 10, m is 0 (zero), and M represents potassium, 30% by weight of a compound represented by formula (I) wherein R has the structure of Olfine P, n is 2.5, m is 0 (zero), and M represents —NH$_4$; and 20% by weight of a compound represented by formula (I) wherein R has the structure of Surfynol 61, n is 3.0, m is 0 (zero), and M represents sodium.

Example B1

| | (wt %) |
|---|---|
| Pigment dispersion 1 | 5.0 (solid basis) |
| Compound B1 | 5.0 |
| DEGmBE | 2.0 |

-continued

Example B1

| | (wt %) |
|---|---|
| Glycerin | 6.0 |
| 1,5-Pentanediol | 5.0 |
| Triethanolamine | 0.8 |
| Ion-exchanged water | Balance |

The compound B1 is a compound represented by formula (I) wherein R has the structure of Surfynol 61, n is 1.0, m is 1.5, and M represents sodium.

Example B2

| | (wt %) |
|---|---|
| Pigment dispersion 2 | 4.5 (solid basis) |
| Compound B2 | 5.0 |
| PGmBE | 2.0 |
| Dipropylene glycol | 5.0 |
| Surfynol 465 | 1.2 |
| Triethanolamine | 0.9 |
| Ion-exchanged water | Balance |

The compound B2 is a compound represented by formula (I) wherein R has the structure of Olfine B, n is 1.0, m is 2.0, and M represents —$N(C_2H_4OH)_3$.

Example B3

| | (wt %) |
|---|---|
| Pigment dispersion 3 | 5.5 (solid basis) |
| Compound B3 | 5.0 |
| DPGmBE | 1.5 |
| Diethylene glycol | 7.0 |
| Thiodiglycol | 3.5 |
| 1,6-Hexanediol | 5.0 |
| Triethanolamine | 1.0 |
| Potassium hydroxide | 0.1 |
| Ion-exchanged water | Balance |

The compound B3 is a compound represented by formula (I) wherein R has the structure of Olfine P, n is 0 (zero), m is 4.5, and M represents a hydrogen atom.

Example B4

| | (wt %) |
|---|---|
| Pigment dispersion 4 | 5.0 (solid basis) |
| C.I. Direct Black 154 | 1.0 |
| Compound B4 | 8.0 |
| TEGmBE | 3.0 |
| Diethylene glycol | 3.0 |
| 1,5-Pentanediol | 2.0 |
| Dimethyl-2-imidazolidinone | 2.0 |
| Sodium benzoate | 0.1 |
| Triethanolamine | 0.7 |
| Ion-exchanged water | Balance |

The compound B4 is a compound represented by formula (I) wherein R has the structure of Surfynol 61, n is 3.0, m is 1.0, and M represents —$NH_4$.

Example B5

| | (wt %) |
|---|---|
| Pigment dispersion 1 | 3.0 (solid basis) |
| C.I. Direct Black 154 | 1.0 |
| Compound B5 as mixture | 7.0 |
| DEGmBE | 2.0 |
| Glycerin | 14.0 |
| Triethanolamine | 0.9 |
| Ion-exchanged water | Balance |

The compound B5 is a mixture composed of: 50% by R has the structure of Surfynol 61, n is 4.0, m is 1.0, and M represents potassium; and 50% by weight of a compound represented by formula (I) wherein R has the structure of Olfine P, n is 2.0, m is 1.0, and M represents potassium.

Example B6

| | (wt %) |
|---|---|
| C.I. Direct Yellow 132 | 5.0 |
| Compound B6 | 6.0 |
| TEGmBE | 4.0 |
| Glycerin | 15.0 |
| Thiodiglycol | 2.0 |
| 1,5-Pentanediol | 1.0 |
| Triethanolamine | 0.9 |
| Ion-exchanged water | Balance |

The compound B6 is a compound represented by formula (I) wherein R has the structure of Surfynol 61, provided that $R^3$ represents an ethyl group, n is 7.0, m is 1.0, and M represents lithium.

Example B7

| | (wt %) |
|---|---|
| C.I. Direct Blue 86 | 5.0 |
| Compound B7 as mixture | 10.0 |
| DEGmBE | 3.0 |
| Glycerin | 5.0 |
| Trimethylolpropane | 1.0 |
| Trimethylolethane | 1.0 |
| Surfynol 465 | 1.0 |
| Triethanolamine | 0.5 |
| Potassium hydroxide | 0.05 |
| Ion-exchanged water | Balance |

The compound B7 is a mixture composed of; 50% by weight of a compound represented by formula (I) wherein R has the structure of Surfynol 61, n is 0 (zero), m is represents —$SO_4K$.

Eample B8

| | (wt %) |
|---|---|
| C.I. Acid Red 52 | 5.5 |
| Compound B8 as mixture | 6.0 |
| Glycerin | 5.0 |
| Diethylene glycol | 5.0 |
| Tetrapropylene glycol | 5.0 |

-continued

Eample B8

| | (wt %) |
|---|---|
| Triethanolamine | 0.9 |
| Potassium hydroxide | 0.1 |
| Ion-exchanged water | Balance |

The compound B8 is a mixture composed of: 50% by weight of a compound represented by formula (I) wherein R has the structure of Olfine B, n is 0 (zero), m is 1.0, and M represents potassium; 30% by weight of a compound represented by formula (I) wherein R has the structure of Olfine P, n is 2.5, m is 1.5, and M represents —$NH_4$; and 20% by weight of a compound represented by formula (I) wherein R has the structure of Surfynol 61, n is 3.0, m is 1.5, and M represents sodium.

Comparative Example 1

| | (wt %) |
|---|---|
| Pigment dispersion 1 | 5.0 (solid basis) |
| Glycerin | 10.0 |
| Dispersant: Hitenol N-07 (manufactured by Dai-Ichi Kogyo Seiyaku Co., Ltd.) | 3.0 |
| Nonionic surfactant: Noigen EA 160 (manufactured by Dai-ichi Kogyo Seiyaku Co., Ltd.) | 1.0 |
| Ion-exchanged water | Balance |

Comparative Example 2

| | (wt %) |
|---|---|
| C.I. Direct Yellow 132 | 5.5 |
| DEGmME | 7.0 |
| Diethylene glycol | 10.0 |
| 2-Pyrrolidone | 5.0 |
| Ion-exchanged water | Balance |

Comparative Example 3

| | (wt %) |
|---|---|
| Pigment dispersion 3 | 5.5 (solid basis) |
| C.I. Direct Black 154 | 2.5 |
| Diethylene glycol | 10.0 |
| Nonionic surfactant: Epan 450 (manufactured by Dai-ichi Kogyo Seiyaku Co., Ltd.) | 1.0 |
| Ion-exchanged water | Balance |

Evaluation 1:

The ink compositions thus obtained, were bidirectionally printed as a plurality of character line patterns having different sizes on the following predetermined test papers. The prints thus obtained were visually inspected for blurring of characters and feathering of characters due to ink migration down paper fibers to evaluate print quality.

The printing was performed by means of an ink jet printer EM-900C under conditions of 360 dpi and fine mode for plain paper. In this evaluation test, plain papers commercially available in Europe, America, and Japan, specifically Conqueror (manufactured by Arjo Wiggins), Favorit (manufactured by XEROGRAFIE), Modo Copy (manufactured by Modo), Rapid Copy (manufactured by igepa), EPSON EPP (manufactured by Seiko Epson Corporation), Xerox P (manufactured by Xerox Corp.), Xerox 4024 (manufactured by Xerox Corp.), Xerox 10 (manufactured by Xerox Corp.), Neenha Bond (manufactured by Kimberly-Clark), Ricopy 6200 (manufactured by Ricoh Co., Ltd.), Yamayuri (manufactured by Honshu Paper Co., Ltd.), and Xerox R (manufactured by Xerox Corp.), were used as test papers.

The results were evaluated according to the following criteria:

A: A Japanese Kanji character "書" in a JIS Minchou form at a size of 3 mm square could be printed without overlapping.

B: A Japanese Kanji character "書" in a JIS Minchou form at a size of 4 mm square could be printed without overlapping.

C: Overlapping was observed in a printed Japanese Kanji character "書" in a JIS Minchou form at a size of 4 mm square.

D: Overlapping was observed in a printed Japanese Kanji character "書" in a JIS Minchou form at a size of 5 mm square.

The results were as summarized in Table 2.

TABLE 1

| | Example A | | | | | | | |
|---|---|---|---|---|---|---|---|---|
| | 1 | 2 | 3 | 4 | 5 | 6 | 7 | 8 |
| Conqueror | A | A | A | A | A | A | A | A |
| Favorit | A | A | A | A | A | A | A | A |
| Modo Copy | A | A | A | A | A | A | A | A |
| Rapid Copy | A | A | A | A | A | A | A | A |
| EPSON EPP | A | A | A | A | A | A | A | A |
| Xerox P | A | A | A | A | A | A | A | A |
| Xerox 4024 | A | A | A | A | A | A | A | A |
| Xerox 10 | A | A | A | A | A | A | A | A |
| Neenha Bond | A | A | A | A | A | A | A | A |
| Ricopy 6200 | A | A | A | A | A | A | A | A |
| Yamayuri | A | A | A | A | A | A | A | A |
| Xerox R | A | A | A | A | A | A | A | A |

TABLE 2

| | Example B | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | D | D | D |
| EPSON EPP | A | A | A | A | A | A | A | A | C | C | C |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | C | C |
| Neenha Bond | A | A | A | A | A | A | A | A | C | D | D |
| Ricopy 6200 | A | A | A | A | A | A | A | A | D | C | D |
| Yamayuri | A | A | A | A | A | A | A | A | D | D | D |
| Xerox R | A | A | A | A | A | A | A | A | D | D | D |

Evaluation 2:

The inks of Examples A1 to A8 and B1 to B8 were placed in sample bottles made of glass. These glass bottles were hermetically sealed, and were then allowed to stand at 60° C. for one week. Before and after the standing, the inks were inspected for sediment and were measured for property values (viscosity and surface tension).

As a result, for all the inks, sediment did not substantially occur, and there was substantially no change in property values between before and after the standing. Thus, all the inks had good storage stability.

What is claimed is:

1. An ink composition comprising a colorant, water, and a compound represented by formula (I):

$$RO[(EO)_n(PO)_m]M \quad (I)$$

wherein

R represents a group represented by formula;

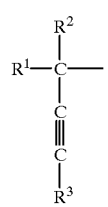

(II)

R$^1$ represents an alkyl, cycloalkyl, or aryl group;

EO represents an ethyleneoxy group;

PO represents a propyleneoxy group;

m and n each are independently 0 (zero) or a natural number of not less than 1, provided that m+n>1;

EO and PO may be arranged, regardless of order in the parentheses of formula (I), randomly or as blocks joined together;

R$^2$ and R$^3$ each independently represent a hydrogen atom or an alkyl group; and M is a group attached to the terminal oxygen atom within the parentheses.

2. The ink composition according to claim 1, wherein m in formula (I) is 0 (zero).

3. The ink composition according to claim 2, wherein n in formula (I) is 1 to 10.

4. The ink composition according to claim 1, wherein m in formula (I) is not 0 (zero).

5. The ink composition according to claim 4, wherein n in formula (I) is 0 (zero) to 10 and m is 1 to 5.

6. The ink composition according to claim 1, wherein M in formula (I) is (i) a hydrogen atom, (ii) an alkali metal, an inorganic base, or an organic base, or (iii) a residue of an acid selected from the group consisting of sulfonic acid, phosphoric acid, and boric acid, or a salt of said acid with said compound (ii).

7. The ink composition according to claim 1, wherein the compound represented by formula (I) has an average molecular weight of not more than 2000.

8. The ink composition according to claim 1, wherein the total number of carbons in R in formula (I) is 4 to 50.

9. The ink composition according to claim 1, wherein R$^1$ in formula (II) has a branched structure.

10. The ink composition according to claim 1, which further comprises a penetrating agent selected from the group consisting of propylene glycol monobutyl ether, dipropylene glycol monobutyl ether, and mixtures thereof.

11. The ink composition according to claim 10, wherein the content of the penetrating agent is not more than 10% by weight.

12. The ink composition according to claim 10 or 11, wherein the weight ratio of the compound represented by formula (I) to the penetrating agent is 1:0 to 1:10.

13. The ink composition according to claim 1, which further comprises an acetylene glycol surfactant.

14. The ink composition according to claim 13, wherein the content of the acetylene glycol surfactant is not more than 5% by weight.

15. The ink composition according to claim 13 or 14, wherein the weight ratio of the compound represented by formula (I) to the acetylene glycol surfactant is 1:0 (zero) to 1:3.

16. The ink composition according to claim 1, which further comprises diethylene glycol monobutyl ether or triethylene glycol monobutyl ether.

17. The ink composition according to claim 16, wherein the content of diethylene glycol monobutyl ether or triethylene glycol monobutyl ether is not more than 20% by weight.

18. The ink composition according to claim 16, wherein the weight ratio of the compound represented by formula (I) to diethylene glycol monobutyl ether or triethylene glycol monobutyl ether is 1:0 (zero) to 1:10.

19. The ink composition according to claim 1, wherein the colorant is a member selected from the group consisting of dyes, pigments, and mixtures thereof.

20. The ink composition according to claim 19, wherein the pigment has been surface treated to introduce a hydrophilic group into the pigment and thus to render the pigment self-dispersible in water.

21. The ink composition according to claim 1, which is used in ink jet recording.

22. A recording method comprising the step of depositing an ink composition onto a recording medium to perform printing, the ink composition being one according to claim 1.

23. An ink jet recording method comprising the steps of: ejecting droplets of an ink composition; and depositing the droplets onto a recording medium to perform printing, the ink composition being one according to claim 1.

24. A record produced by the recording method according to claim 22.

* * * * *